Oct. 1, 1940.  J. DE LA CIERVA  2,216,162
AIRCRAFT HAVING FREELY ROTATIVE WINGS
Original Filed Dec. 22, 1936  3 Sheets-Sheet 1
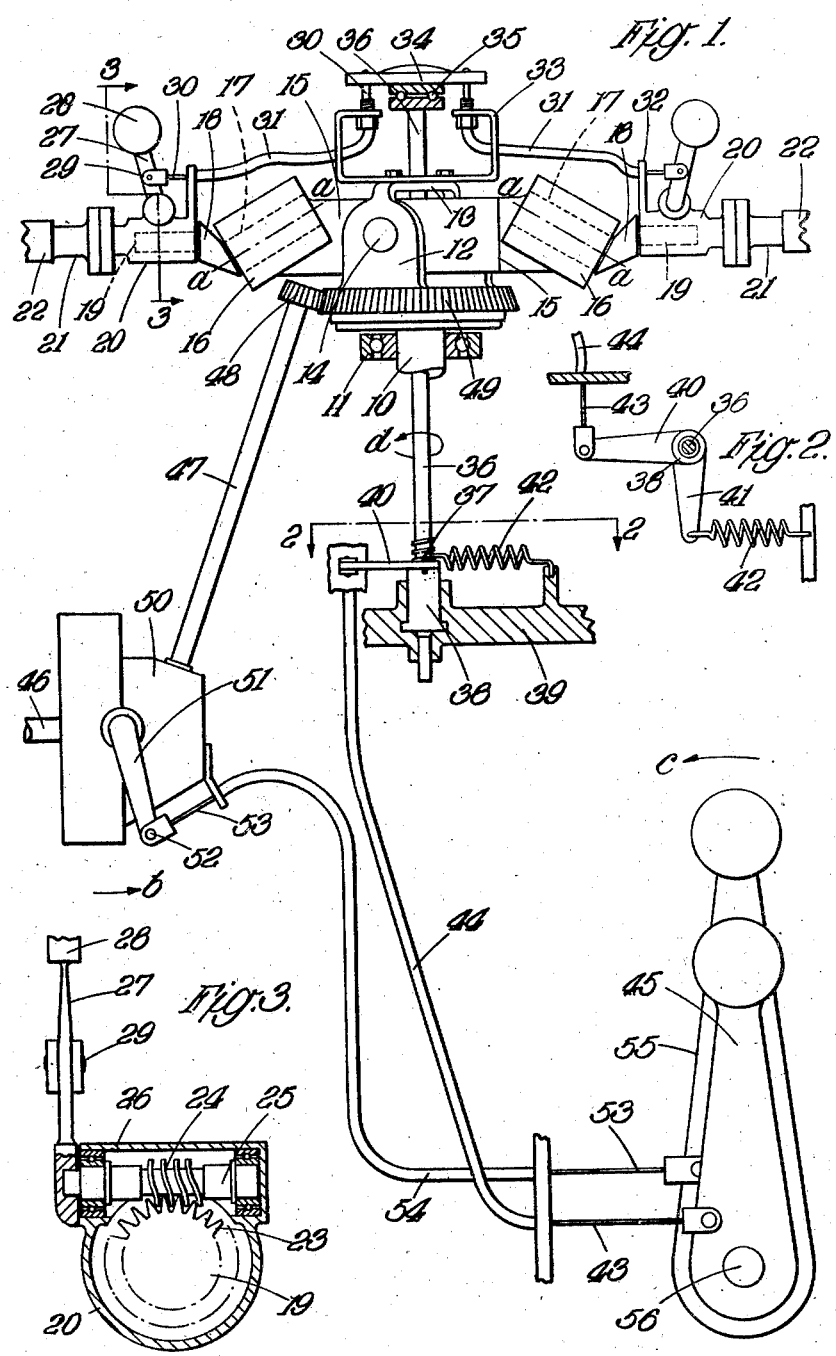

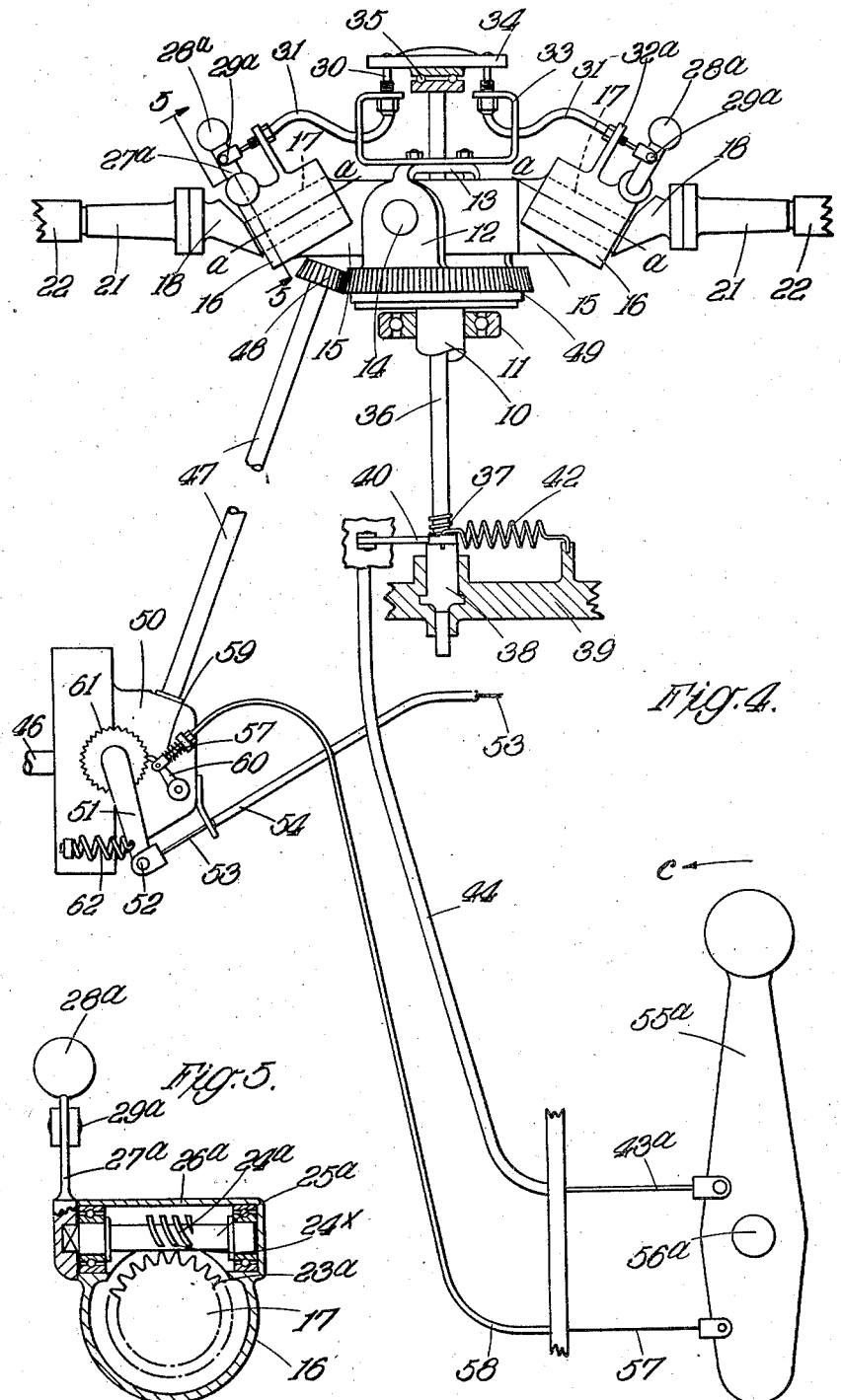

Oct. 1, 1940.  J. DE LA CIERVA  2,216,162
AIRCRAFT HAVING FREELY ROTATIVE WINGS
Original Filed Dec. 22, 1936  3 Sheets-Sheet 3
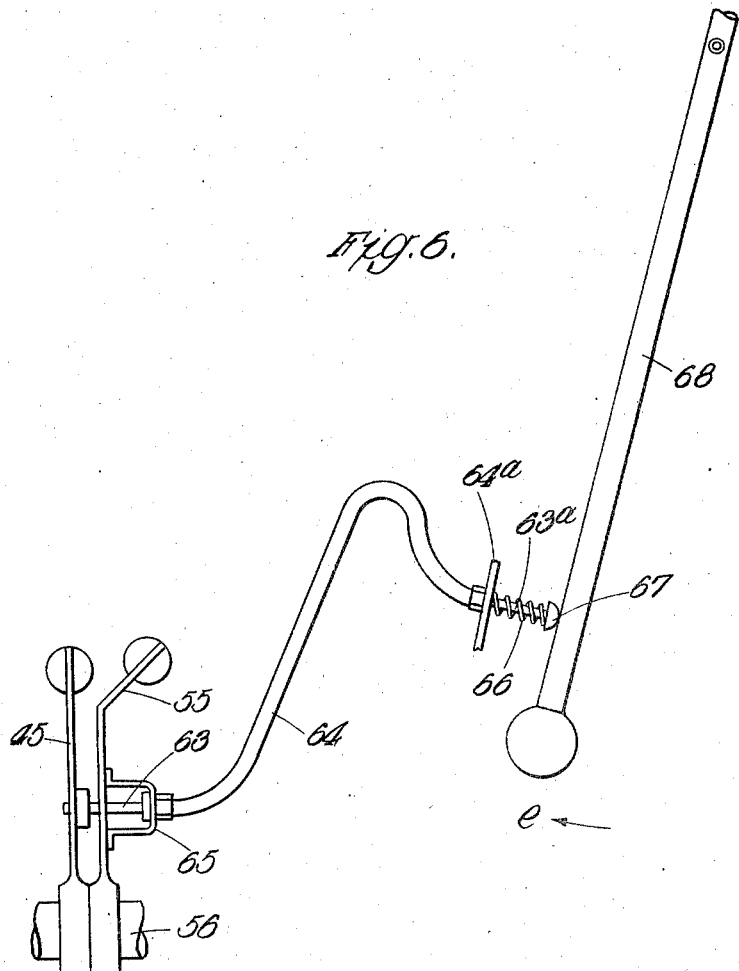
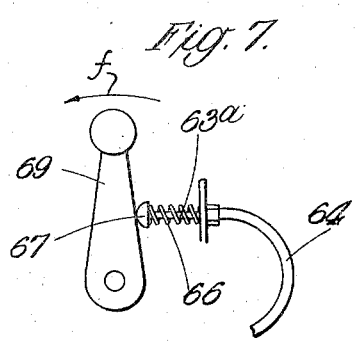
INVENTOR
Juan de la Cierva
BY Symmestreet & Lechner
ATTORNEYS

UNITED STATES PATENT OFFICE 2,216,162

AIRCRAFT HAVING FREELY ROTATIVE WINGS

Juan de la Cierva, Aldwych, London, England, assignor, by mesne assignments, to Autogiro Company of America, a corporation of Delaware Application December 22, 1936, Serial No. 117,221. Renewed December 13, 1939. In Great Britain December 23, 1935

30 Claims. (Cl. 244—18)

The invention relates to rotative winged aircraft of the kind having a propulsive power plant, a normally autorotative sustaining rotor, a "rotor-starting" transmission connecting the power plant to the rotor and including a clutch for engaging and disengaging the starter transmission.

The invention refers to the method of "taking-off" which consists in over-speeding the rotor by means of the starter transmission, the latter having a suitable gear ratio for this purpose, with the rotor blades set at a small pitch angle, preferably zero, and increasing the blade pitch angle to a value at least as great as that utilised in autorotative flight substantially at the same time as the starter transmission is disengaged, in order to utilise the excess kinetic energy of the over-speeded rotor to raise the aircraft substantially vertically from the ground.

Whereas it is desirable for this purpose to ensure that the initiation of the disengagement of the starter clutch and of increase of the rotor blade pitch angle take place substantially at the same time it may also be desirable to regulate the pitch angle, e. g. in flight and on landing, independently of the operation of the clutch and to engage and disengage the clutch independently of the regulation of pitch angle.

According to the present invention, in an aircraft of the kind above referred to, having mechanism for controlling the clutch and mechanism for variably regulating the pitch angles of all the rotor blades together and equally, manual control means are provided operative on each of these mechanisms permitting full operation of either of said mechanisms without changing the position of the other and so arranged as to permit conjoint operation of both mechanisms, at least for disengaging the clutch and increasing the blade pitch angle from its minimum at least to its normal value in flight, by a single motion on the part of the pilot.

By "control means operative on the blade pitch angle" it must be understood means operable by the pilot to cause a change of pitch angle at least in certain circumstances and the change of blade pitch angle may be effected by any suitable means. For instance, the regulation of pitch angle may be entirely mechanical and at all times under the control of the pilot, being effected by means of a train of mechanism connecting the pilot's control member with the rotor blades. On the other hand, the pitch regulation may be at least partly automatic; for example it may be effected by means responsive to any or all of the forces operative on the blades themselves, among which are the applied torque and centrifugal force; and the action of the automatic pitch regulating means may be inhibited or modified, when required, by the operation of a pilot's control member. Further by "clutch controlling means" is to be understood means controlled by the pilot and operative on the clutch and may comprise a hand lever provided with a direct mechanical connection to the clutch members, or preferably, a manually operated releasing device adapted to retain the clutch in engaged position and operable to release the clutch for movement to disengaged position under the action of spring means, the engagement of the clutch being effected by a separate lever or the like.

The invention is susceptible of a number of constructional embodiments. For example, a control lever regulating the pitch angle and a control lever actuating the clutch release may be arranged side by side, similarly to the throttle control levers of twin-engined aircraft in such a way that either lever can be operated independently but both levers can be operated by one hand of the pilot for the purpose of simultaneously releasing the starter clutch and increasing the pitch angle. To obtain this result the two levers must register with one another when the clutch releasing lever is in the "clutch engaged position" and the pitch control lever is in the minimum pitch position.

Alternatively, a common lever may be employed having a continuous travel comprising two consecutive stages, viz. a clutch operating stage and a pitch controlling stage. In this case the two stages of the travel will not overlap but the "clutch engaged" position will be adjacent the "minimum pitch" position. With this arrangement pitch regulation can only take place when the clutch is disengaged and engagement and disengagement of the clutch can only take place when the pitch is a minimum.

Again independent pitch regulating and clutch controlling means may be provided with a controllable interlock whereby the clutch and pitch controls may be operated together or released for independent operation as required.

Such interlock may be interconnected with other controls of the aircraft, e. g. the flying control lever or the throttle control in such a way that the interlocking or otherwise of the clutch and pitch control depends on the longitudinal position of the control lever or on the throttle opening.

The nature of this invention and in what way it may be performed will be more fully understood from the following description with reference to the accompanying drawings of two embodiments of the invention and certain modifications.

In the drawings:

Fig. 1 is a diagrammatic view in side elevation showing such parts of a rotative winged aircraft as are comprised in one embodiment of the present invention;

Figs. 2 and 3 are sectional detail views taken along the lines 2—2 and 3—3 respectively of Fig. 1;

Fig. 4 is a view similar to Fig. 1 showing an alternative embodiment of the invention;

Fig. 5 is a sectional detail view taken along the line 5—5 of Fig. 4; and

Figs. 6 and 7 are detail views showing modifications of the arrangement of Fig. 1.

The embodiment of the invention according to Fig. 1 is incorporated in a rotative winged aircraft whose construction, with the exception of the parts shown in the drawings, may be of a known type and present no unusual features, for which reason the aircraft itself is not illustrated. Such an aircraft will comprise, among other things, in addition to a body, a normally autorotative sustaining rotor and a propulsive power plant.

Referring to Fig. 1, the generally vertical rotative axle of the rotor indicated at 10 is supported in bearings 11 which are mounted in a part of the fixed structure of the aircraft (not shown). The axle 10 terminates upwardly in a pair of ears 12 connected above by a bridge-piece 13. The ears 12 support a single "flapping" pivot pin 14 which is perpendicular to the axis of the rotor and slightly skewed with respect to the longitudinal (radial) axes of the blades. On the flapping pivot pin are pivotally mounted a pair of oppositely directed drag links 15 suitably provided with interpenetrating bifurcations (not shown) to enable them to be pivoted on the common pivot pin 14. Integral with the drag links 15 are housings 16 mounted on inclined pivots whose axes are indicated by the lines a—a. The pins 17 of these pivots rotatable in the housing 16 are formed integrally with cranked connecting parts 18 and pins 19, on which are rotatably mounted root members 20 suitably flanged for connection to the roots 21 of the blades 22; the axes of the pivotal connections 19, 20 being coincident with the longitudinal axes of the blades. Each of the pivot pins 19 is provided with a worm gear 23 engaged by a worm 24 carried on a cross shaft 25 journalled in a housing 26 integral with the blade root member 20 (see Fig. 3). The shaft 25 carries at one end an external lever 27 terminating in a bob weight 28 and connected at 29 to a flexible motion transmitting element 30, operative in tension. The tension element 30 is enclosed in the usual sheath 31, one end of which is secured in an abutment plate 32 integral with the blade root member 20. The other ends of both the sheaths 31 are secured to a bracket 33 mounted on the bridge-piece 13 and both the tension elements 30 are connected to a plate 34, which rotates with the hub and is vertically movable, by means of a non-rotative vertical rod 36 which passes coaxially through the hollow axle 10. A thrust bearing 35 is interposed between the plate 34 and the rod 36 which is vertically movable and carries at its lower end a thread 37 engaging a nut 38 rotatably mounted in a convenient support 39. On the nut 38 is mounted a bell crank lever 40, one arm 41 of which is anchored to the support 39 by means of a tension spring 42. The other arm 40 of the bell crank lever is connected to a flexible motion transmitting element 43 operative in tension and enclosed in the usual sheath 44 (see also Fig. 2). The other end of the tension element 43 is connected to a manual control lever 45.

To decrease the pitch angle of the blades the lever 45 is moved in the opposite direction to the arrow C in Fig. 1 until it reaches the position shown in Fig. 1, thus causing the tension element 43 to rotate the bell crank lever 40, 41 in a clockwise direction as seen in Fig. 2. This actuates the screw jack mechanism 36, 37 which is right handed, to raise the rod 36, bearing 35 and plate 34, and the movement of the latter is communicated by the tension elements 30 to the levers 27, which are thereby drawn inwards and actuate the worm gearing 24, 23 to rotate the blade root members 20 counterclockwise with respect to the pins 19, as seen in Fig. 3. The blades being connected to the root members, are thereby rotated in the same direction so as to decrease their pitch, the direction of rotation of the rotor being indicated by the arrow d in Fig. 1.

On moving the lever 45 in the direction of the arrow c in Fig. 1, the tension element 43 is slackened and the spring 42 is enabled to rotate the bell crank lever 40, 41 and nut 38 in a counterclockwise direction, as seen in Fig 2, thereby lowering the rod 36. If the rotor is rotating, centrifugal force acting on the bob weights 28 maintains the elements 30 in tension and when the rod 36 is lowered rocks the levers 27 outwards, thereby actuating the worm gearing 23, 24 so as to rotate the blade root members, and with them the blades 21, 22, clockwise as seen in Fig. 3, and increase their pitch angles.

For starting purposes the rotor is connected to the power plant by a transmission comprising a shaft 46 driven by the power plant, a clutch, bevel or the like gearing and an upwardly extending shaft 47. The latter carries at its upper end a pinion 48 engaging a crown gear 49 mounted on the rotor axle 10. The details of the clutch and of the gearing contained in the housing 50, are not illustrated as they may be of any suitable known type, the clutch being a friction clutch of the kind usual in motor car practice with the exception that, whereas in a motor car the clutch is engaged by spring means and the actuating gear operates to disengage the clutch, in this instance the clutch is disengaged by spring means and the actuating gear operates to engage it. This actuating gear is controlled by a lever 51 movable in the direction of the arrow b for engaging the clutch, being connected at 52 for this purpose to a flexible tension element 53 enclosed in a sheath 54 of the usual kind and terminating in a connection to a manual lever 55, which is mounted on the same axis 56 as the hand lever 45 but movable independently thereof. In the position shown in Fig. 1 the clutch is engaged, and movement of the lever 55 in the direction of the arrow c in Fig. 1 by releasing the tension element 53 enables the clutch to be disengaged by the spring means provided for this purpose.

It will therefore be seen that in the position shown in Fig. 1 the clutch is engaged and the pitch angle of the blades is a minimum. In this position the levers 45 and 55 are in register with one another and a conjoint movement of the two levers about their common axis in the direction of the arrow c operates to disengage the clutch and increase the pitch angle of the blades simultaneously. It will also be seen that the levers 45 and 55 can be operated entirely independently to perform their respective functions. A certain amount of rotation of the rotor is necessary to enable the pitch changing mechanism to operate, on account of its dependence on the centrifugal force of the bob weights 28. However, when the rotor is quite stationary it does not matter what the pitch angles of the blades are and the speed of rotation required to make the pitch changing mechanism operative is very small, as it is only necessary to have enough centrifugal force on the bob weights 28 to overcome the friction of the worm gear 23, 24. The pitch of the worm 24 is sufficiently low to make the gear irreversible, so that the pitch angle of the blade is not affected by aerodynamic pitching moments and centrifugal and other couples acting on the blades itself about its longitudinal axis.

In the alternative embodiment illustrated in Figs. 4 and 5 the pitch changing mechanism is applied to the inclined pivots 16, 17 of the blades. In this instance the cranked parts 18, which are integral with pins 17 of the inclined pivots, are directly secured to the roots 21 of the blades 22, and the actuating mechanism more particularly shown in Fig. 5 is carried by the housings 16 of the inclined pivots; thus, each housing 16 comprises a part 26a in which is journalled a shaft 25a carrying a worm 24a and an external lever 27a carrying a bob weight 28a, the external lever being connected at 29a to the tension element 30, and the abutment plate 32a of the sheath 31 being integral with the housing 16.

In this embodiment also the control connection 53, 54 actuating the clutch lever 51 is connected for the purpose of engaging the clutch to a separate manual control (not shown) and the clutch is retainable in engagement by means of a pawl and ratchet device comprising a pawl 60, loaded by a spring 59, engaging a ratchet wheel 61 carried by the lever 51. A spring 62 is connected to the lever 51 for returning it to the disengaged position when it is released from the pawl 60 and this spring assists to hold the pawl in engagement until it is forcibly released.

In this embodiment a single manual control lever 55 is used, rotatable on an axis 56a and connected to the tension element 43a actuating the pitch regulating mechanism as shown in Fig. 4. The lever 55a is also connected (as shown) to a tension element 57, enclosed in a sheath 58, which element is connected to the pawl 60 so that movement of the lever 55a in the direction of the arrow c pulls the tension element 57 and releases the pawl 60, thus allowing the clutch to disengage. This movement of the lever 55a, by releasing the tension on the element 43a, also allows the spring 42 to actuate the pitch regulating mechanism in the direction for increasing the pitch angle of the blades. A very small movement of the lever 55a is sufficient to disengage the pawl 60 from the ratchet 61, thus disengaging the clutch, and the various parts of the pitch regulating mechanism are so proportioned that a much more extended movement of the lever 55a is necessary to bring about any substantial increase of the blade pitch angle; in fact, by reason of the back-lash in the screw jack mechanism 37, 38, and the worm gearing 24a, 25a, the change of pitch does not really begin until the clutch is released.

As in this instance the pitch changing mechanism operates on the inclined pivot 16, 17 which is required to be free in normal autorotative flight, so that the blades may oscillate upon these pivots and adjust their pitch automatically accordingly as they lag or lead from their normal radial positions, the threads of the worm 24a are broken as shown at 24x so that when the lever 27a has moved outwards to a predetermined extent, the threads of the worm 24a become disengaged from the teeth of the worm wheel 23a.

It will therefore be seen that on moving the lever 55a in the direction of the arrow c to its fullest extent, the pitch angle of the blades is first increased under complete control from a minimum to a maximum value and the blades are then rendered free to oscillate on their inclined pivots and vary their pitch angle automatically in accordance with their oscillations in the plane of rotation. If the back-lash in the screw and nut gear 37, 38 and the worm gearing 24a, 23a, is not sufficient to ensure that the pitch angle of the blades is not increased until the clutch is disengaged, the threads of the worm 24a may be further broken in a similar manner to that shown at 24x and in such a way that when the levers 27a are at the inner end of their swing, the lever 55a being in the clutch engaged position as shown in Fig. 4, the worms 24a are disengaged from the worm wheels 23a and only come into engagement after some slight outward movement of the lever 27a.

In all other respects the embodiment of Figs. 4 and 5 is similar to that of Figs. 1 and 2, the description of which, in so far as it refers to parts having identical reference figures in Figs. 1, 2 and 4, being deemed to form part of the description with reference to Fig. 4.

The embodiment according to Figs. 4 and 5 differs from that of Figs. 1 to 3 in two particulars, viz. the association of the pitch regulating mechanism with the inclined blade pivots, (the separate pitch varying pivots of Fig. 1 being eliminated), and the substitution of a single control lever for the independent levers of Fig. 1. Either of these modifications may be adopted separately, i. e. the double lever arrangement of Fig. 1 may be combined with the pitch regulating arrangement of Figs. 4 and 5 or the single lever control of Figs. 4 and 5 combined with the pitch regulating arrangement of Figs. 1 to 3.

Figs. 6 and 7 illustrate a controllable interlock between the levers 55 and 45 shown in Fig. 1. In Fig. 6 a pin 63 is arranged to pass through holes registering with one another in the levers 45 and 55 respectively, the pin 63 being connected to a motion transmitting element 63a operative in compression as well as in tension and enclosed within a flexible sheath 64 supported in a bracket 65 attached to the lever 55 and in a suitable fixed abutment 64a at the other end.

The transmission element 63a is provided with a button 67, at its end remote from the levers 45, 55, which is positioned to make contact with the pilot's flying control column 68, here represented as a "hanging" control column, and a spring 66 is provided to bias the transmission element 63a and pin 63 to a position of disengagement from the levers 45, 55. When the latter are in register with one another, the pin can be caused to traverse the hole provided in the lever 45 and thereby lock the levers 45, 55 together by moving the control column 68 forward in the direction of the arrow e (Fig. 6) so that it presses the button 67 home.

When it is required to release the clutch and increase the pitch angles simultaneously for the purpose of effecting a vertical take-off, the flying control column is always held (or locked)

in the most forward position, and the mechanism above described with reference to Fig. 6 then prevents any possibility of the pilot operating one of the levers 45, 55 without operating the other. When, however, the aircraft is in the air and the control column is pulled back, the pin 63 is withdrawn from the lever 45, by the action of the spring 66 and the pitch angle may be regulated without reference to the engagement or disengagement of the clutch.

Fig. 7 illustrates an alternative arrangement for the same purpose in which the button 67 of the transmission element 68a is arranged to be actuated by the throttle control lever 69. The direction in which this lever is moved to open the throttle is indicated by the arrow f. The lever 69 and button 67 are so positioned that when the throttle is closed the pin 63 is engaged with lever 45, locking it to the lever 55, and is not released therefrom until the throttle opening exceeds the maximum amount utilised in accelerating the rotor prior to "taking-off."

What I claim is:

1. In an aircraft sustaining rotor having a hub and a plurality of autorotatable blades, pivot mechanism for mounting the blades on the hub including for each blade a pivot having its axis substantially in alignment with the longitudinal axis of the blade, control means for regulating simultaneously in like sense the pitch angles of all the blades on said pivot axes, and apparatus comprising pivot axis means obliquely angled to the longitudinal blade axes providing for individual variation of pitch of each blade in conjunction with swinging oscillation thereof under the influence of flight forces.

2. In an aircraft sustaining rotor having a hub and a plurality of autorotatable variable-pitch blades, pivot means mounting the blades on the hub, controllable mechanism for altering the effective pitch of the blades over a predetermined portion of their pitch range, and means rendering said mechanism ineffective when the blade pitch passes a limit of said portion of the pitch range.

3. In an aircraft sustaining rotor having a hub and a plurality of autorotatable variable-pitch blades, pivot means mounting the blades on the hub, controllable mechanism for altering the effective pitch of the blades over a predetermined portion of their pitch range, and means rendering said mechanism ineffective when the blade pitch passes the positive pitch limit of said portion of the pitch range.

4. In an aircraft sustaining rotor having a hub and a plurality of autorotatable blades, pivot means mounting the blades on the hub, controllable mechanism for altering the effective pitch of the blades over a predetermined pitch range, and means rendering said mechanism ineffective when the blade pitch passes a certain limit of said range, the said pivot means which mount the blades on the hub including pivot axes obliquely angled to the longitudinal blade axes whereby flight oscillations of the blades thereon effect automatic regulation of the pitch.

5. In an aircraft having a sustaining rotor comprising a hub and a plurality of autorotatable sustaining blades, disconnectible drive means for rotating said rotor, pivot mechanism mounting said blades on said hub including for each blade a pivot providing for automatic swinging and pitch-varying movements, of the blade under the influence of flight forces, and for each blade another pitch varying pivot, means acting under the influence of the centrifugal force of rotation of the rotor to raise the mean effective pitch angle of all the blades on said other pivots, controllable means for holding the blades at a reduced pitch during the operation of said drive means, and means for interrelating the operation of the drive means and said controllable means.

6. In an aircraft having a sustaining rotor comprising a hub, a plurality of autorotatable blades and pivot mechanism mounting said blades on said hub, independently operatable disconnectible drive means for the rotor and independently operatable means for raising and lowering the effective pitch of the blades of the rotor, and control means for said two independent means so positioned that they are jointly actuable by a single motion of the pilot to effect disconnection of the drive means and raising of the blade pitch.

7. In an aircraft having a sustaining rotor comprising a hub, a plurality of autorotatable blades and pivot mechanism mounting said blades on said hub, independently operatable disconnectible drive means for the rotor and independently operatable means for raising and lowering the effective pitch of the blades of the rotor, and an interlock between said two independent means mounted for movement between operative and inoperative positions.

8. In an aircraft having a sustaining rotor comprising a hub, a plurality of autorotatable blades and pivot mechanism mounting said blades on said hub, independently operatable disconnectible drive means for the rotor and independently operatable means for raising and lowering the effective pitch of the blades of the rotor, and a movable flight control for the craft adapted in at least one position to interlock said two independent means.

9. In an aircraft having a sustaining rotor comprising a hub, a plurality of autorotatable blades and pivot mechanism mounting said blades on said hub, independently operatable disconnectible drive means for the rotor and independently operatable means for raising and lowering the effective pitch of the blades of the rotor, and a movable fore and aft control member for the craft adapted to interlock said two independent means at least when in its foremost control position.

10. In an aircraft having a sustaining rotor comprising a hub, a plurality of autorotatable blades and pivot mechanism mounting said blades on said hub, independently operatable disconnectible drive means for the rotor and independently operatable means for raising and lowering the effective pitch of the blades of the rotor, and a throttle control for a forward propulsion engine of the craft adapted to interlock said two independent means at least when in retarded position.

11. In an aircraft having a sustaining rotor comprising a hub, a plurality of autorotatable blades and pivot mechanism mounting said blades on said hub including pitch-varying pivot means, a worm gear device for regulating the blade pitch, a centrifugally-actuated weight for operating said device in one direction of pitch change, and a manual control for operating said device in the opposite direction of pitch change.

12. In an aircraft having a sustaining rotor comprising a hub, a plurality of autorotatable blades and pivot mechanism mounting said blades on said hub including pitch-varying pivot means, and a worm gear device controllable in flight to vary the blade pitch, said device being irreversible as against pitch change thereabout under the influence of aerodynamic pitching moments acting on the blades themselves.

13. In an autorotatable sustaining rotor, an upright hub or axis member, a sustaining blade, and mechanism mounting said blade on said hub comprising a pitch-varying pivot substantially coaxial with the longitudinal blade axis and a pivot providing for swinging of the blade about an axis oblique to the longitudinal blade axis.

14. In an autorotatable sustaining rotor, an upright hub or axis member, a sustaining blade, and mechanism mounting said blade on said hub comprising a pitch-varying pivot substantially coaxial with the longitudinal blade axis and a pivot providing for swinging of the blade about an axis oblique to the axis of the hub.

15. In an autorotatable sustaining rotor, an upright hub or axis member, a sustaining blade, and mechanism mounting said blade on said hub comprising a pitch-varying pivot substantially coaxial with the longitudinal blade axis and a pivot providing for swinging of the blade about an axis oblique to the axis of the hub and to the longitudinal blade axis.

16. In an autorotatable sustaining rotor, an upright hub or axis member, a sustaining blade, and mechanism mounting said blade on said hub comprising a pitch-varying pivot substantially coaxial with the longitudinal blade axis and a pair of oblique pivots one of which is oblique to the longitudinal blade axis when viewed in plan and the other of which is oblique to the longitudinal blade axis when viewed in elevation.

17. In an autorotatable sustaining rotor, an upright hub or axis member, a sustaining blade, and mechanism mounting said blade on said hub comprising a pitch-varying pivot substantially coaxial with the longitudinal blade axis and a pivot which when projected on a plane containing the rotor axis and the longitudinal blade axis is downwardly and outwardly inclined with respect to the longitudinal blade axis.

18. In an autorotatable sustaining rotor, an upright hub or axis member, a sustaining blade, and mechanism mounting said blade on said hub comprising a pitch-varying pivot substantially coaxial with the longitudinal blade axis and a pivot which when projected on a plane containing the rotor axis and the longitudinal blade axis is downwardly and outwardly inclined with respect to the longitudinal blade axis, and a third pivot which when projected on a plane perpendicular to the rotor axis is oblique to the longitudinal blade axis.

19. In an autorotatable sustaining rotor, an upright hub or axis member, a sustaining blade, and mechanism mounting said blade on said hub comprising a pitch-varying pivot substantially coaxial with the longitudinal blade axis and a pivot which when projected on a plane containing the rotor axis and the longitudinal blade axis is downwardly and outwardly inclined with respect to the longitudinal blade axis, and a third pivot which when projected on a plane perpendicular to the rotor axis is oblique to the longitudinal blade axis and intersects the rotor axis.

20. In an aircraft, a sustaining rotor comprising a generally upright hub, an autorotatable blade and pivot mechanism mounting said blade on said hub including a pivot obliquely angled to the longitudinal blade axis in a direction to effect increase of blade pitch with a lagging movement of the blade, another pivot for effecting variation of blade pitch, means for driving the rotor, and controllable means for holding said blade at a reduced pitch position on said second named pivot during operation of the driving means.

21. In an aircraft, a sustaining rotor comprising a rotatable hub member, a plurality of aeroform blades, and pivot mechanism mounting said blades on said member and including, for each blade, pivot means for effecting automatic individual variation of the pitch independently as to each blade under the influence of aerodynamically-effected displacements of the radial axis of the blade in at least one plane with respect to the hub member, another pitch varying pivot for each blade, controllable means for altering the mean pitch angle of all the blades together on the latter pivots, controllable means for driving the rotor, and means for co-ordinating the operation of the last two mentioned means.

22. The combination, in an aircraft, of a power plant, an autorotatable sustaining rotor including a generally upright hub and blades pivotally secured thereto including mechanism for varying the effective pitch of the blades, mechanism for driving said rotor from said power plant, a separately operatable control for each of said mechanisms, and means for interconnecting said controls at will for common operation.

23. The combination, in an aircraft, of a power plant, an autorotatable sustaining rotor including a generally upright hub and blades pivotally secured thereto including mechanism for varying the effective pitch of the blades, mechanism for driving said rotor from said power plant, a separately operatable control for each of said mechanisms, and means for interconnecting said controls at will for common operation, the two controls and their interconnection being so constructed that when connected together the blade pitch is reduced when the driving mechanism is operated and is increased when said mechanism is thrown out of operation.

24. In an aircraft having a sustaining rotor comprising a hub and a plurality of autorotatable sustaining blades, disconnectible drive means for rotating said rotor, pivot mechanism mounting said blades on said hub including pivot means oblique to the longitudinal axes of the blades for automatic swinging and pitch-varying movements of the blades independently of each other under the influence of aerodynamic forces in flight, the pivot mechanism further including other pivot means providing for pitch varying movement of the blades, and weight means actuated under the influence of the centrifugal force of rotation of the rotor to alter the mean effective pitch of all the blades by moving them about said other pivot means.

25. In an aircraft having a sustaining rotor comprising a hub and a plurality of autorotatable sustaining blades, disconnectible drive means for rotating said rotor, pivot mechanism mounting said blades on said hub including pivot means oblique to the longitudinal axes of the blades for automatic swinging and pitch varying movements of the blades independently of each other under the influence of aerodynamic forces in flight, the pivot mechanism further including other pivot means providing for pitch varying movement of the blades, weight means acting under the influence of the centrifugal force of rotation of the rotor to raise the mean effective pitch angle of all the blades by moving them about said other pivot means, and controllable means for holding the blades at a reduced pitch during the operation of said drive means.

26. In a normally autorotatable aircraft sustaining rotor adapted to be power driven at start, a hub structure, a rotor blade, pivot mechanism securing said blade to said hub comprising pivot means arranged to effect decrease of pitch in association with leading oscillation of the blade and increase of pitch upon lagging oscillation with reference to said pivot means, and means for holding the blade in a leading position with reference to said pivot means during application of driving torque to the rotor.

27. In an aircraft, a sustaining rotor having a hub, a blade and pivot mechanism for mounting the blade on the hub and providing a pivot axis inclined outwardly and downwardly with respect to the longitudinal axis of the blade, whereby leading displacements of the blade about said axis are accompanied by decrease in pitch thereof and lagging displacements of the blade about said axis are accompanied by increase in pitch thereof, means for delivering torque to the rotor, and means for maintaining the blade in a leading position during the application of torque.

28. In an aircraft, disconnectible rotor driving mechanism, an autorotatable sustaining rotor having a generally upright hub and a sustaining blade mounted thereon for autorotative actuation at a positive mean pitch angle, mechanism articulating the sustaining blade to the hub including pivot means providing a blade pivot axis inclined upwardly and inwardly with respect to the longitudinal axis of the blade, and means for holding said blade in a leading position with reference to said pivot axis during operation of the rotor driving mechanism.

29. In an aircraft, a sustaining rotor comprising a hub disposed on a generally upright axis, an aeroform blade rotatable about said axis, and mechanism securing said blade on said hub including a pitch-change mounting providing for pitch-change movement automatically coordinated with substantial lag-and-lead movement of the blade, an automatic pitch altering device normally urging the blade, when rotating, in one direction of pitch change, and a controllable pitch altering device for positively moving the blade in the opposite direction of pitch change.

30. In an aircraft, a sustaining rotor comprising a hub disposed on a generally upright axis, an aeroform blade rotatable about said axis, and mechanism securing said blade on said hub including an oblique pivot providing for conjoint pitch-change movement and substantial lag-and-lead movement of the blade, an automatic pitch altering device normally urging the blade, when rotating, in one direction of pitch change, and a controllable pitch altering device for positively moving the blade in the opposite direction of pitch change.

JUAN DE LA CIERVA.